United States Patent
Imawaka et al.

(10) Patent No.: US 12,554,135 B2
(45) Date of Patent: Feb. 17, 2026

(54) DISPLAY DEVICE

(71) Applicant: Panasonic Automotive Systems Co., Ltd., Kanagawa (JP)

(72) Inventors: Kosuke Imawaka, Kyoto (JP); Ken'ichi Kasazumi, Osaka (JP); Keiji Sugiyama, Kyoto (JP)

(73) Assignee: PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 119 days.

(21) Appl. No.: 18/612,569

(22) Filed: Mar. 21, 2024

(65) Prior Publication Data
US 2024/0329398 A1  Oct. 3, 2024

(30) Foreign Application Priority Data
Mar. 31, 2023  (JP) ................. 2023-057681

(51) Int. Cl.
*G02B 27/01* (2006.01)
*G02B 6/42* (2006.01)

(52) U.S. Cl.
CPC ....... *G02B 27/0103* (2013.01); *G02B 6/4206* (2013.01)

(58) Field of Classification Search
None
See application file for complete search history.

(56) References Cited

U.S. PATENT DOCUMENTS

| | | |
|---|---|---|
| 2022/0091421 A1 | 3/2022 | Kasegawa |
| 2022/0214503 A1* | 7/2022 | Waldern .......... G02B 6/34 |
| 2024/0027762 A1* | 1/2024 | Kasazumi .......... B60K 35/60 |

FOREIGN PATENT DOCUMENTS

JP  2020-112746  7/2020

* cited by examiner

*Primary Examiner* — Derek S. Chapel
(74) *Attorney, Agent, or Firm* — Greenblum & Bernstein, P.L.C.

(57) ABSTRACT

A display device includes a light guide body including first holographic optical element and a second holographic optical element, and an image light emitter that emits image light to the light guide body. In addition, the first holographic optical element includes a plurality of first cells for emitting first image light toward the second holographic optical element, the first image light being obtained by diffracting the image light propagating inside the light guide body. In addition, the second holographic optical element includes a plurality of second cells for emitting second image light obtained by diffracting the first image light propagating inside the light guide body. In addition, an arrangement of the plurality of first cells is different from an arrangement of the plurality of second cells.

12 Claims, 6 Drawing Sheets

DISPLAY DEVICE

CROSS REFERENCE TO RELATED APPLICATION

The present application is based on and claims priority of Japanese Patent Application No. 2023-057681 filed on Mar. 31, 2023.

FIELD

The present disclosure relates to a display device.

BACKGROUND

As a related art, a waveguide for a head-up display including a plurality of holographic optical elements within the waveguide is known. For example, Patent Literature 1 discloses an optical device including a first waveguide, a second waveguide, a first deflection unit provided on the first waveguide, and a second deflection unit provided on the second waveguide.

CITATION LIST

Patent Literature

PTL 1: Japanese Unexamined Patent Application Publication No. 2020-112746

SUMMARY

Technical Problem

The optical device according to PTL 1 can be improved upon.

In view of this, the present disclosure is capable of improving upon the above related art.

Solution to Problem

A display device according to an aspect of the present disclosure includes a light guide body including a first holographic optical element and a second holographic optical element; and an image light emitter that emits image light to the light guide body, wherein the first holographic optical element includes a plurality of first cells for emitting first image light toward the second holographic optical element, the first image light being obtained by diffracting the image light propagating inside the light guide body, the second holographic optical element includes a plurality of second cells for emitting second image light obtained by diffracting the first image light propagating inside the light guide body, and an arrangement of the plurality of first cells is different from an arrangement of the plurality of second cells.

Advantageous Effects

A display device and the like of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Hereinafter, embodiments will be specifically described with reference to the drawings.

It should be noted that all embodiments described below show comprehensive or specific examples. The numerical values, shapes, materials, components, arrangement positions and connection forms of the components, steps, order of steps, and the like shown in the following embodiments are examples, and are not intended to limit the present disclosure. In addition, among the components in the following embodiments, the components not described in the independent claims are described as arbitrary components.

In addition, each figure is a schematic diagram and is not necessarily exactly illustrated. In addition, in each figure, the same reference numerals are attached to the same components.

In addition, in the following embodiments, expressions such as rectangular-shaped, approximately parallel, and in the X-axis direction are used. For example, rectangular-shaped, approximately parallel, and in the X-axis direction not only mean completely rectangular, parallel, and in the X-axis direction, but also substantially rectangular, parallel, and in the X-axis direction, that is, it also means that it includes errors of about several percentages. In addition, rectangular, parallel, and in the X-axis direction mean rectangular, approximately parallel, and in the X-axis direction within the range where the effects of the present disclosure can be achieved. The same also applies to such a case that other expressions using "shaped", "approximately", and "direction" exist.

Embodiment

<Configuration>

Figure 1A:
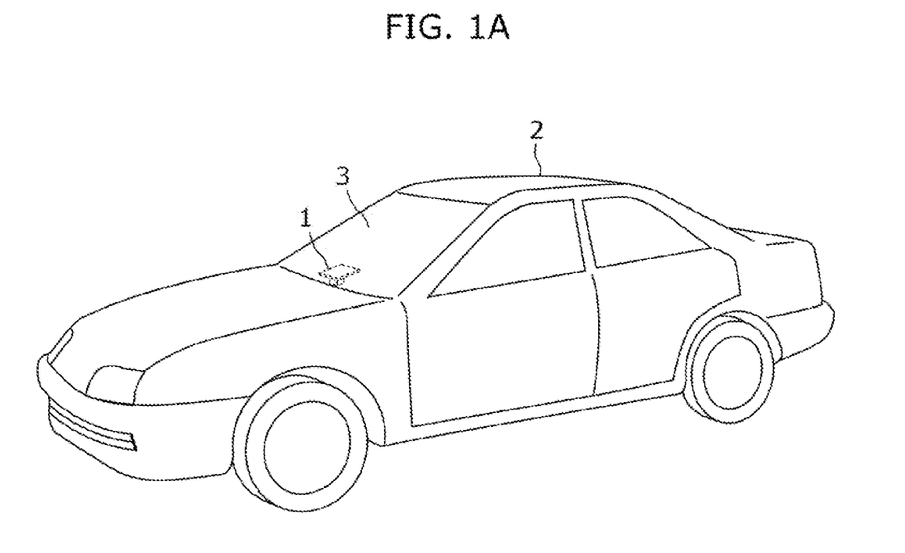
FIG. 1A is a schematic diagram showing an example of a vehicle in which a display device according to an embodiment is installed.
Figure 1B:
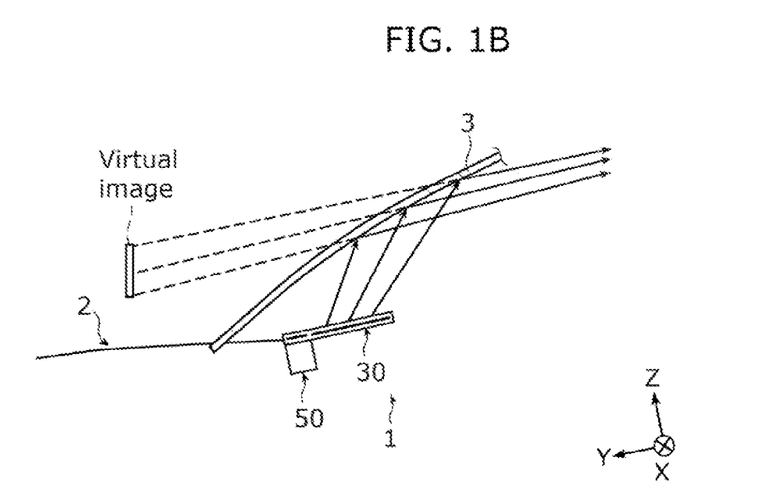
FIG. 1B is a schematic diagram showing the display device according to the embodiment and the vehicle viewed from the side.
Figure 2:
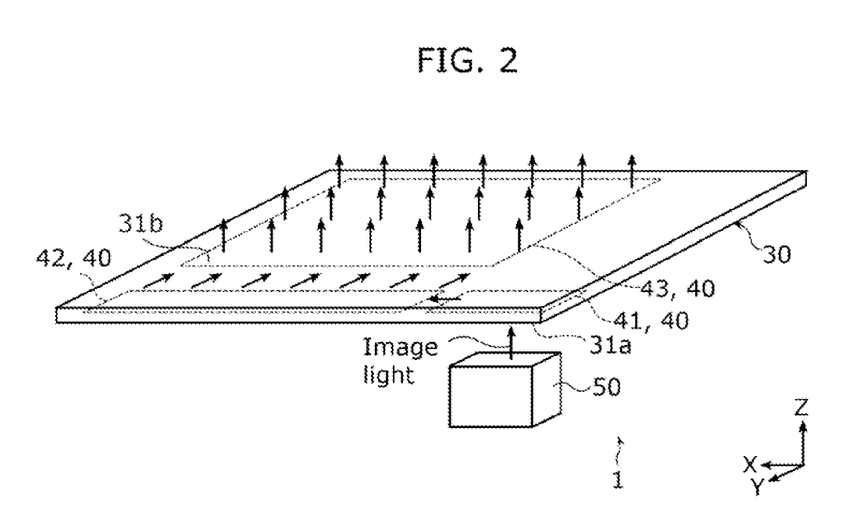
FIG. 2 is a perspective view showing the display device according to the embodiment.
Figure 3:
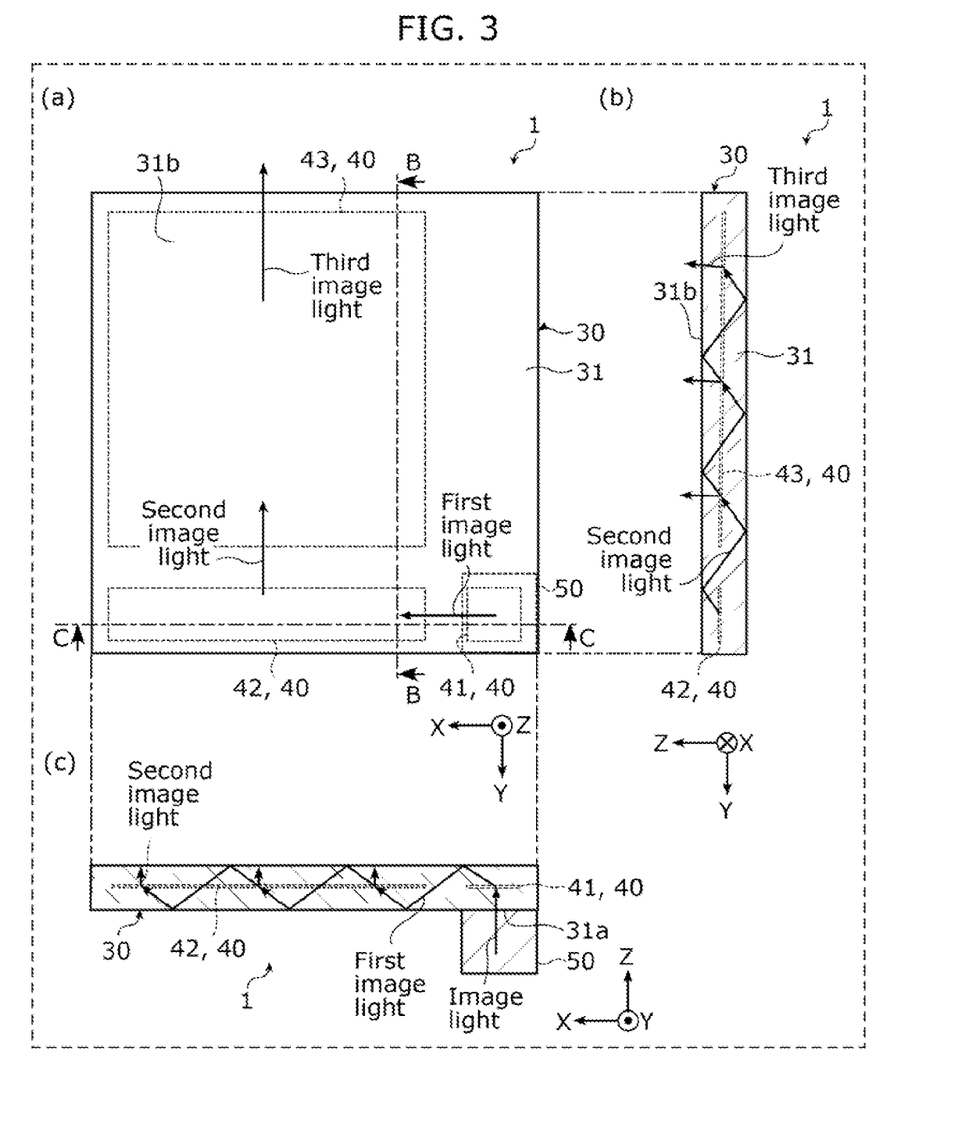
FIG. 3 is a diagram showing the display device according to the embodiment.

First, the configuration of display device 1 will be explained with reference to FIG. 1A to FIG. 3. FIG. 1A is a schematic diagram showing an example of vehicle 2 in which display device 1 according to an embodiment is installed. FIG. 1B is a schematic diagram showing display device 1 according to the embodiment and vehicle 2 when viewed from the side. FIG. 2 is a perspective view showing display device 1 according to the embodiment. FIG. 3 is a diagram showing display device 1 according to the embodiment. (a) in FIG. 3 is a front view of display device 1, (b) in FIG. 3 is a sectional view of display device 1 taken along line B-B in (a) in FIG. 3, and (c) in FIG. 3 is a sectional view of display device 1 taken along line C-C in (a) in FIG. 3.

As shown in FIG. 1A and FIG. 1B, display device 1 can cause the image light to enter the human's eyes by emitting and reflecting the image light on a light reflector. For example, when display device 1 is used in vehicle 2, display device 1 can make the image light enter the human eye by reflecting the image light emitted onto front window 3, which is a translucent member. In this case, by display device 1 emitting image light and projecting the image shown in the image light onto the translucent member, a virtual image corresponding to the image can be displayed on the translucent member. The image light is light that shows an image, and is light that displays a virtual image in front of front window 3. The image is a still image or a moving image, and is an image showing numbers, characters, figures, and the like.

As shown in FIG. 1B and FIG. 2, display device 1 includes image light emitter 50 and light guide body 30.

Image light emitter 50 is an image generating device that emits image light to light guide body 30. By image light emitter 50 emitting image light representing a rectangular image, the image light is projected onto front window 3 via light guide body 30. This allows the user to recognize the virtual image.

Such image light emitter 50 includes a plurality of emitters, a plurality of dichroic mirrors, a condenser lens, a mirror, and an emitting surface.

The plurality of emitters are each different from one another and emits a light beam which is light in a predetermined wavelength band. Each of the plurality of dichroic mirrors is placed on the light beam emitted by the emitter, and can reflect the light beam in the predetermined wavelength band and transmit a light beam in other wavelength bands. A condenser lens is a lens that condenses light beams emitted through a dichroic mirror onto a plurality of mirrors. The emitting surface is a screen such as a microlens array or a liquid crystal display element such as liquid crystal on silicon (LCOS), and by being irradiated with light beams in a plurality of wavelength bands from the mirror side, the transmitted light can be emitted as image light toward light guide body 30.

Light guide body 30 is a hologram waveguide that displays an image shown by the image light to the user. Light guide body 30 has a light transparency and can emit an image shown in the image light emitted by image light emitter 50 by stretching it in the X-axis direction and the Y-axis direction. Light guide body 30 is arranged to face image light emitter 50 and front window 3.

Light guide body 30 is formed with incident surface 31a and emitting surface 31b.

Incident surface 31a is arranged to face the emitting surface of image light emitter 50. The image light emitted from the emitting surface of image light emitter 50 is incident on incident surface 31a. Incident surface 31a is a part of the back surface of rectangular light guide body 30. The back surface is the surface opposite to emitting surface 31b of light guide body 30.

Emitting surface 31b is the image light that was incident from incident surface 31a, and emits the image light that propagated inside light guide body 30 toward front window 3. Emitting surface 31b faces front window 3 and is separated from front window 3 by a predetermined distance. Emitting surface 31b is a part of the front surface of light guide body 30.

Figure 4:
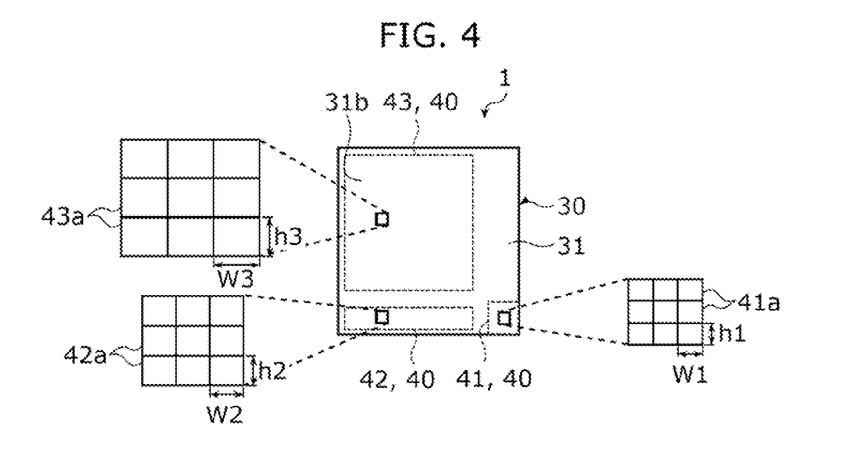
FIG. 4 is a diagram showing the display device and a cell of a holographic optical element according to an embodiment.

As shown in FIG. 3 and FIG. 4, light guide body 30 includes light guide 31 having a light transparency and a plurality of holographic optical elements 40.

Light guide 31 is formed with incident surface 31a that faces image light emitter 50. Incident surface 31a is a surface facing image light emitter 50, and is a part of the back surface of light guide 31. In addition, light guide 31 is formed with emitting surface 31b so as to face front window 3. Emitting surface 31b is a part of the front surface of light guide 31.

Light guide 31 comprises a material having a light transparency such as glass and resin material, for example.

A plurality of holographic optical elements 40 are included inside light guide 31. As shown in FIG. 3, the plurality of holographic optical elements 40 are light transmission type optical elements that diffract and emit light propagating within light guide 31. The plurality of holographic optical elements 40 are included in light guide 31 with an orientation substantially parallel to incident surface 31a and emitting surface 31b of light guide 31. The plurality of holographic optical elements 40 comprise a material having a light transparency.

The plurality of holographic optical elements 40 include first holographic optical element 41, second holographic optical element 42, and third holographic optical element 43.

First holographic optical element 41 and second holographic optical element 42 are arranged side by side in the X-axis direction. Second holographic optical element 42 and third holographic optical element 43 are arranged side by side in the Y-axis direction. In addition, first holographic optical element 41 is arranged so as to overlap incident surface 31a of light guide body 30 when viewed in the Z-axis direction and overlap the emitting surface of image light emitter 50 arranged on the negative side in the Z-axis direction of light guide body 30.

First holographic optical element 41 is an incident holographic optical element on which the image light emitted by image light emitter 50 is incident. First holographic optical element 41 receives the image light emitted from the emitting surface of image light emitter 50 and travelling in the Z-axis plus direction, and emits the incident image light toward second holographic optical element 42. Specifically, first holographic optical element 41 emits the first image light (deflected light), which is obtained by deflecting the image light which is image light from image light emitter 50 and is incident from incident surface 31a, toward second holographic optical element 42. More specifically, when the image light incident on light guide body 30 propagates inside light guide body 30, first holographic optical element 41 deflects the image light through diffraction according to the diffraction efficiency of first holographic optical element 41, and emits the image light as the first image light propagating in the X-axis plus direction. The first image light deflected through diffraction at first holographic optical element 41 is incident on second holographic optical element 42.

Second holographic optical element 42 is arranged on the positive side in the X-axis direction of first holographic optical element 41 and on the light emission side of first holographic optical element 41, and is arranged on the positive side in the Y-axis direction of third holographic optical element 43 and on the light incident side of third holographic optical element 43.

Second holographic optical element 42 is elongated in the X-axis direction, and is a folding holographic optical element that diffracts the first image light emitted by first holographic optical element 41 and emits the second image light to third holographic optical element 43.

The first image light emitted from first holographic optical element 41 is incident on second holographic optical element 42. Second holographic optical element 42 further deflects through diffraction the first image light deflected through diffraction by first holographic optical element 41, and emits the deflected second image light (deflected light). Specifically, each time the first image light that has passed through first holographic optical element 41 is incident (transmitted), second holographic optical element 42 emits the second image light obtained by further deflecting the incident first image light through diffraction toward third holographic optical element 43. More specifically, when the first image light incident on second holographic optical element 42 propagates inside light guide body 30 in the X-axis plus direction, second holographic optical element 42 further deflects the first image light through diffraction depending on the diffraction efficiency of second holographic optical element 42. At this time, second holographic optical element 42 stretches the image of the first image light in the X-axis direction. Accordingly, second holographic optical element 42 emits the second image light stretched in the X-axis direction in the Y-axis minus direction. The second image light deflected through diffraction at second holographic optical element 42 is incident on third holographic optical element 43.

Third holographic optical element 43 is arranged on the negative side in the Y-axis direction of second holographic optical element 42 and on the light emission side of second holographic optical element 42. In addition, third holographic optical element 43 is arranged so as to overlap and face emitting surface 31b of light guide body 30.

Third holographic optical element 43 is an emitting holographic optical element that is in a rectangular shape when viewed along the Z-axis direction.

The second image light emitted from second holographic optical element 42 is incident on third holographic optical element 43. Third holographic optical element 43 further deflects through diffraction the second image light deflected through diffraction by second holographic optical element 42, and emits the deflected third image light (deflected light) to the outside of light guide body 30. Specifically, each time the second image light that has passed through second holographic optical element 42 is incident (transmitted), third holographic optical element 43 emits the third image light obtained by further deflecting the incident second image light through diffraction at a predetermined emission angle. More specifically, when the second image light deflected by second holographic optical element 42 through diffraction propagates within light guide body 30 in the Y-axis minus direction, third holographic optical element 43 further deflects the second image light through diffraction depending on the diffraction efficiency of third holographic optical element 43. At this time, third holographic optical element 43 further stretches the image of the second image light that has been stretched in the X-axis direction substantially in the Y-axis direction. Accordingly, third holographic optical element 43 emits the third image light stretched in the X-axis direction and substantially the Y-axis direction to the outside of light guide body 30 at a predetermined emission angle. That is, third holographic optical element 43 further stretches the second image light emitted by second holographic optical element 42 approximately in the Y-axis direction, thereby emitting the third image light expanded in the X-axis direction and the Y-axis direction at a predetermined emission angle. In the present embodiment, third holographic optical element 43 emits the third image light in the Z-axis plus direction so as to face front window 3.

Here, the predetermined emission angle is the emission angle of the third image light emitted from the emission surface of third holographic optical element 43, and the angle of the emitted light with respect to the normal to the emission surface of third holographic optical element 43.

In addition, third holographic optical element 43 may diverge the third image light to be emitted so that the third image light has different emission angles. Third holographic optical element 43 may make the emission angles different from one another depending on the position (portion) on third holographic optical element 43 when the incident second image light is deflected through diffraction. Accordingly, third holographic optical element 43 can make the emission angles of some third image light beams out of the third image light beams deflected by third holographic optical element 43 through diffraction different from one another.

Figure 5:
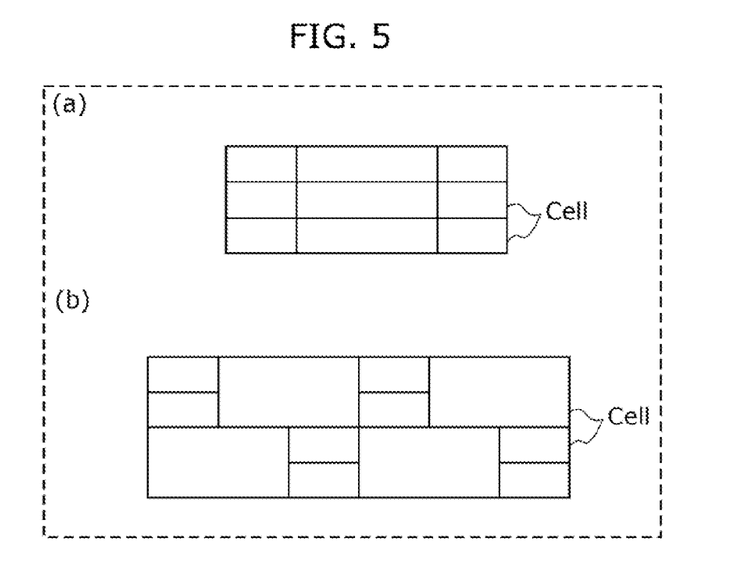
FIG. 5 is a diagram showing a cell of another holographic optical element according to an embodiment.

Next, the specific configurations of first holographic optical element 41, second holographic optical element 42, and third holographic optical element 43 will be described with reference to FIG. 4 and FIG. 5.

FIG. 4 is a diagram showing display device 1 and cells of holographic optical element 40 according to the embodiment. FIG. 5 is a diagram showing cells of another holographic optical element according to the embodiment.

As shown in FIG. 4, first holographic optical element 41 includes a plurality of first cells 41a for emitting the first image light obtained by diffracting and deflecting the image light propagating inside light guide body 30 toward second holographic optical element 42. Second holographic optical element 42 includes a plurality of second cells 42a for emitting the second image light obtained by diffracting and deflecting the first image light propagating inside light guide body 30. Third holographic optical element 43 includes a plurality of third cells 43a for emitting the third image light obtained by diffracting and deflecting the second image light propagating inside light guide body 30.

In the present embodiment, each of the plurality of first cells 41a has the same size and the same shape, each of the plurality of second cells 42a has the same size and the same shape, and each of the plurality of third cells 43a has the same size and the same shape. In addition, the plurality of first cells 41a, the plurality of second cells 42a, and the plurality of third cells 43a have the same shape. In addition, each of the plurality of first cells 41a, the plurality of second cells 42a, and the plurality of third cells 43a is polygonal-shaped. FIG. 4 illustrates a case where each of the plurality of first cells 41a, the plurality of second cells 42a, and the plurality of third cells 43a has a substantially rectangular shape.

The arrangement of the plurality of first cells 41a, the arrangement of the plurality of second cells 42a, and the arrangement of the plurality of third cells 43a are different from one another. It should be noted that only two of the three arrangements, the arrangement of the plurality of first cells 41a, the arrangement of the plurality of second cells 42a, and the arrangement of the plurality of third cells 43a, may be different. Different arrangement means that the arrays or positions of the plurality of first cells 41a, the plurality of second cells 42a, and the plurality of third cells 43a are different, and that when holographic optical elements 40 are viewed one over the other, the boundary where two adjacent cells are in contact with each other is different for each holographic optical element 40.

When the plurality of first cells 41a, the plurality of second cells 42a, and the plurality of third cells 43a are arranged differently, the following example can be used.

For example, the size of the plurality of first cells 41a, the size of the plurality of second cells 42a, and the size of the plurality of third cells 43a may be different from one another. It should be noted that only two of the three sizes of the plurality of first cells 41a, the plurality of second cells 42a, and the plurality of third cells 43a may be different.

For example, the plurality of first cells 41a, the plurality of second cells 42a, and the plurality of third cells 43a may gradually increase in size in the stated order. That is, the closer the holographic optical element is to the incident side where the image light emitted by image light emitter 50 is incident, the smaller the cell size may be. It should be noted that the size of the plurality of first cells 41a may only be smaller than the size of the plurality of second cells 42a or the size of the plurality of third cells 43a, and the size of the plurality of second cells 42a may only be smaller than the size of the plurality of third cells 43a.

For example, the lengths of the first sides (h1, w1) in the plurality of first cells 41a may not be integral multiples of the lengths (h2, w2) of the second sides in the plurality of second cells 42a corresponding to the first sides. In addition, the lengths of the first sides (h1, w1) in the plurality of first cells 41a may not be integral multiples of the lengths (h3, w3) of the third sides in the plurality of third cells 43a corresponding to the first sides. That is, $h1 \neq n*h2$, $h2 \neq n*h3$, $h1 \neq n*h3$, $w1 \neq m*w2$, $w2 \neq m*w3$, and $w1 \neq m*w3$ are satisfied. Here, n and m are natural numbers. In addition, the lengths of the second sides (h2, w2) in the plurality of second cells 42a may not be integral multiples of the lengths (h3, w3) of the third sides in the plurality of third cells 43a corresponding to the second sides. Accordingly, the size of the plurality of first cells 41a, the size of the plurality of second cells 42a, and the size of the plurality of third cells 43a can be made different.

For example, at least one of first holographic optical element 41, second holographic optical element 42, or third holographic optical element 43 may include two or more types of cells with different sizes. The plurality of first cells 41a may include two or more types of first cells 41a with different sizes. In addition, the plurality of second cells 42a may include two or more types of second cells 42a with different sizes. In addition, the plurality of third cells 43a may include two or more types of third cells 43a with different sizes. For example, as shown in (a) and (b) in FIG. 5, a holographic optical element may be configured by combining large rectangular cells and small rectangular cells.

For example, at least one of first holographic optical element 41, second holographic optical element 42, or third holographic optical element 43 may include two or more types of cells with different shapes. That is, the plurality of first cells 41a may include two or more types of first cells 41a with different shapes. In addition, the plurality of second cells 42a may include two or more types of second cells 42a with different shapes. In addition, the plurality of third cells 43a may include two or more types of third cells 43a with different shapes. For example, a holographic optical element may be configured by combining square cells and rectangular cells.

With such a configuration, the arrangement of the plurality of first cells 41a, the arrangement of the plurality of second cells 42a, and the arrangement of the plurality of third cells 43a can be made different. For this reason, in the third image light emitted from emitting surface 31b, it becomes difficult for the noise in the first image light generated at the boundary where two adjacent first cells 41a of the plurality of first cells 41a are in contact with each other, the noise in the second image light generated at the boundary where two adjacent second cells 42a of the plurality of second cells 42a are in contact with each other, and the noise in the third image light generated at the boundary where two adjacent third cells 43a of the plurality of third cells 43a are in contact with each other to overlap with one another.

Next, how the virtual image looks will be explained with reference to FIG. 6 and FIG. 7.

Figure 6:
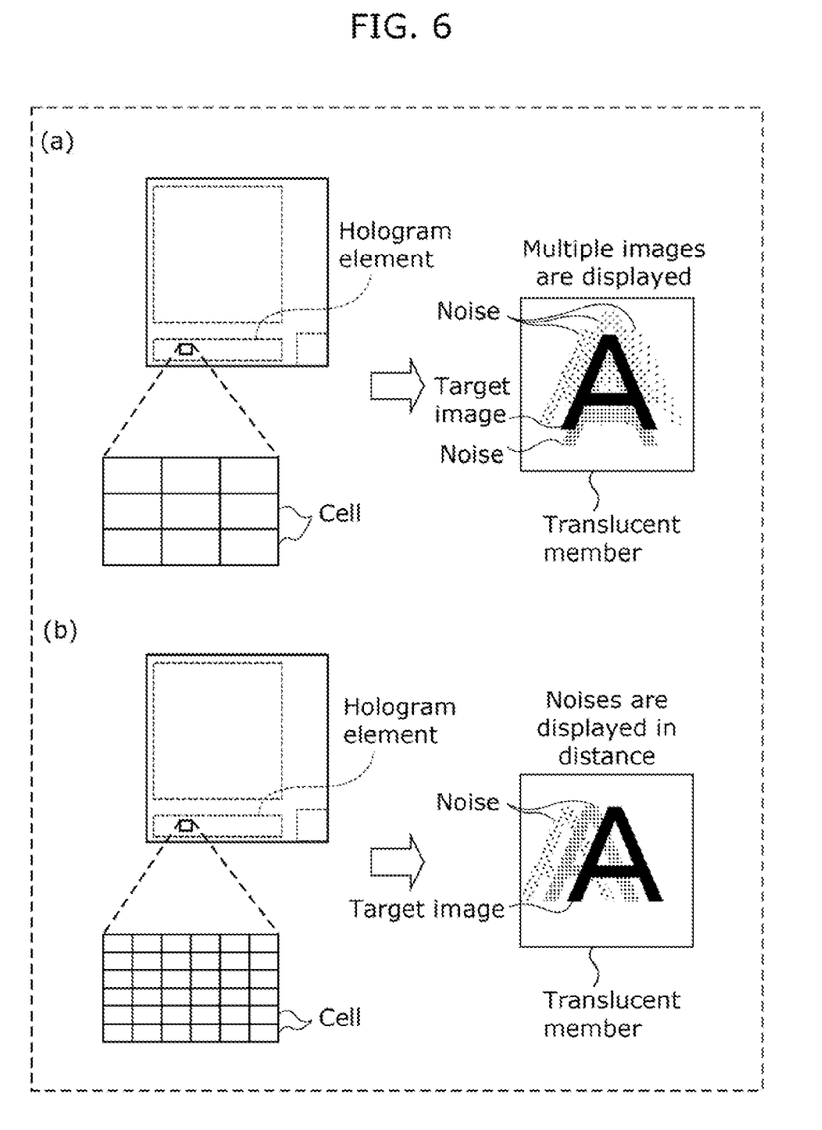
FIG. 6 is a diagram showing the relationship between the cell size of a holographic optical element and a virtual image projected onto a translucent member.

FIG. 6 is a diagram showing the relationship between the cell size of the holographic optical element and the virtual image projected onto the translucent member. FIG. 7 is a diagram showing a virtual image when the holographic optical element of the comparative example is used and a virtual image when display device 1 according to the embodiment is used. (a) in FIG. 7 shows the appearance of a virtual image projected onto a translucent member when a first holographic optical element, a second holographic optical element, and a third holographic optical element as a comparative example are used. (b) in FIG. 7 shows the appearance of a virtual image projected onto a translucent member when first holographic optical element 41, second holographic optical element 42, and third holographic optical element 43 of display device 1 according to the embodiment are used.

As shown in (a) and (b) in FIG. 6, it has been found that when the cell sizes differ, the appearance of the virtual image projected onto the translucent member differs.

For example, (a) in FIG. 6 illustrates a case where a cell with a large cell size is used as a holographic optical element, and (b) in FIG. 6 illustrates a case where a cell with a small cell size is used as a holographic optical element.

In a display device using a holographic optical element configured with a plurality of cells with a large cell size as shown in (a) in FIG. 6, when a virtual image is projected onto the translucent member, a black target image and multiple images, which are a plurality of noises indicated by hatched dots, are displayed on the translucent member to be seen around the target image.

In a display device using a holographic optical element configured with a plurality of cells with a small cell size as shown in (b) in FIG. 6, when a virtual image is projected onto the translucent member, a black target image and a plurality of noises, which are indicated by hatched dots, are displayed on the translucent member to be seen far away from the target image.

In this way, the appearance of noise differs depending on the cell size.

Figure 7:
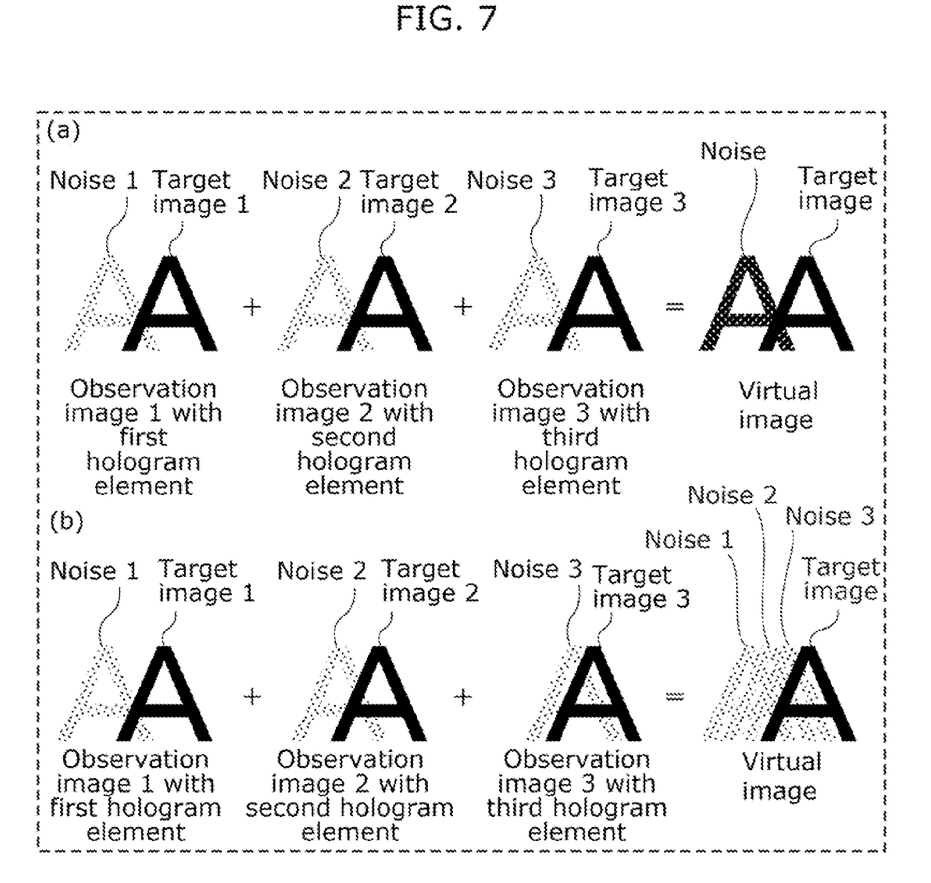
FIG. 7 is a diagram showing a virtual image when a holographic optical element of a comparative example is used and a virtual image when a display device according to the embodiment is used.

In (a) in FIG. 7, the cells of the first holographic optical element, the second holographic optical element, and the third holographic optical element are configured to have the same arrangement. In this case, the first image light emitted from the first holographic optical element shows observation image 1 including target image 1 and low-luminance noise 1 indicated by dot hatching. In addition, the second image light emitted from the second holographic optical element shows observation image 2 including target image 2 and low-luminance noise 2 indicated by dot hatching. In addition, the third image light emitted from the third holographic optical element shows observation image 3 including target image 3 and low-luminance noise 3 indicated by dot hatching. Noises 1 to 3 are formed at the same position with respect to target images 1 to 3, respectively. For this reason, the virtual image projected onto the translucent member shows a target image in which respective observation images 1 to 3 are overlapped into one, and a noise indicated by dot hatching in which low-luminance noises 1 to 3 are overlapped into one. In this case, the noise of the virtual image projected onto the translucent member has high luminance, making it difficult to distinguish the noise from the target image, and there is a possibility that the visibility of the target image may be impaired.

In (b) in FIG. 7, in order not to overlap noises, the arrangement of the plurality of first cells 41*a*, the arrangement of the plurality of second cells 42*a*, and the arrangement of the plurality of third cells 43*a* are made different in first holographic optical element 41, second holographic optical element 42 and third holographic optical element 43, respectively. In this case, the first image light emitted from first holographic optical element 41 shows observation image 1 including target image 1 and low-luminance noise 1 indicated by dot hatching. In addition, the second image light emitted from second holographic optical element 42 shows observation image 2 including target image 2 and low-luminance noise 2 indicated by dot hatching. In addition, the third image light emitted from third holographic optical element 43 shows observation image 3 including target image 3 and low-luminance noise 3 indicated by dot hatching. Noises 1 to 3 are formed at the different position with respect to target images 1 to 3, respectively. For this reason, the virtual image projected onto the translucent member shows a target image in which respective observation images 1 to 3 are overlapped into one, and noises 1 to 3 arranged separately. In this case, since noises 1 to 3 of the virtual image projected onto the translucent member hardly overlap, low-luminance noises 1 to 3 are only faintly formed around the target image, the target image can be correctly recognized, and the visibility of the target image is less likely to be impaired.

<Working Effects>

Next, the working effects of display device 1 in the present embodiment will be explained.

In a related art, when a large-area deflection unit (holographic optical element) is produced, it is generally possible to obtain a large-area holographic optical element by dividing the holographic optical element into minute regions and sequentially exposing each region. However, in the optical device of PTL 1, when the holographic optical element is made to have a large area, a phase difference in light and a fluctuation in light intensity occur at the boundary line where each region is in contact. When such a holographic optical element is used, there is a problem that linear noise occurs in the image light emitted from the holographic optical element.

Therefore, as mentioned above, display device 1 according to the present embodiment includes light guide body 30 including first holographic optical element 41 and second holographic optical element 42, and image light emitter 50 that emits image light to light guide body 30. In addition, first holographic optical element 41 includes a plurality of first cells 41*a* for emitting first image light, which is obtained by diffracting the image light propagating inside light guide body 30, toward second holographic optical element 42. In addition, second holographic optical element 42 includes a plurality of second cells 42*a* for emitting second image light obtained by diffracting the first image light propagating inside light guide body 30. The arrangement of the plurality of first cells 41*a* is different from the arrangement of the plurality of second cells 42*a*.

Conventionally, since the arrangement of the plurality of first cells in the first holographic optical element and the arrangement of the plurality of second cells in the second holographic optical element are the same, noise due to the phase difference and intensity fluctuation between the image light generated at the boundary where two adjacent first cells are in contact with each other and the image light generated at the boundary where two adjacent second cells are in contact with each other may overlap. In this case, when the display device projects image light onto the display medium, high-luminance noise may be projected.

Therefore, according to the present embodiment, since the arrangement of the plurality of first cells 41*a* in first holographic optical element 41 and the arrangement of the plurality of second cells 42*a* in second holographic optical element 42 are different, it becomes difficult for the noise in the first image light generated at the boundary where two adjacent first cells 41*a* of the plurality of first cells 41*a* are in contact with each other and the noise in the second image light generated at the boundary where two adjacent second cells 42*a* of the plurality of second cells 42*a* are in contact with each other to overlap with each other. That is, it becomes difficult for the noises due to phase difference and intensity fluctuation between the first image light emitted by first holographic optical element 41 and the second image light emitted by second holographic optical element 42 to overlap with each other.

Therefore, display device 1 can emit image light in which noise is made inconspicuous.

In addition, in display device 1 according to the present embodiment, the size of the plurality of first cells 41*a* and the size of the plurality of second cells 42*a* are different from each other.

According to this, it becomes difficult for the noise in the first image light generated at the boundary where two adjacent first cells 41*a* included in first holographic optical element 41 are in contact with each other and the noise in the second image light generated at the boundary where two adjacent second cells 41*a* included in second holographic optical element 42 are in contact with each other to overlap each other. For this reason, display device 1 can emit image light in which noise is made inconspicuous.

In addition, in display device 1 according to the present embodiment, the size of the plurality of second cells 42*a* is larger than the size of the plurality of first cells 41*a*.

According to this, when second holographic optical element 42 is manufactured, it is possible to suppress an increase in the time required for exposure. In particular, in the present embodiment, since second holographic optical element 42 is larger than first holographic optical element 41, it is possible to suppress an increase in the manufacturing time of second holographic optical element 42.

In addition, since the size of the plurality of second cells 42*a* is larger than the size of the plurality of first cells 41*a*, it becomes difficult for the noise in the first image light and the noise in the second image light to overlap each other. For this reason, display device 1 can emit image light in which noise is made inconspicuous.

In addition, in display device 1 according to the present embodiment, each of the plurality of first cells 41*a* has the same size and the same shape. Each of the plurality of second cells 42*a* has the same size and the same shape.

According to this, since each of the plurality of first cells 41*a* included in first holographic optical element 41 can be made to have the same size and the same shape, first holographic optical element 41 can be easily manufactured. In addition, since each of the plurality of second cells 42*a* included in second holographic optical element 42 can be made to have the same size and the same shape, second holographic optical element 42 can also be easily manufactured.

In addition, since the size of the plurality of first cells 41*a* and the size of the plurality of second cells 42*a* are different, it becomes difficult for the noise in the first image light and the noise in the second image light to overlap each other. For this reason, display device 1 can emit image light in which noise is made inconspicuous.

In addition, in display device 1 according to the present embodiment, each of the plurality of first cells 41*a* and the plurality of second cells 42*a* is polygonal-shaped. In addition, the plurality of first cells 41*a* and the plurality of second cells 42*a* have the same shape. The lengths of the first sides of the plurality of first cells 41*a* are not integral multiples of the lengths of the second sides of the plurality of second cells 42*a* corresponding to the first sides.

In this way, by making sure that the lengths of the first sides are not integral multiples of the lengths of the second sides, the arrangement of the plurality of first cells 41*a* and the arrangement of the plurality of second cells 42*a* can be easily made different.

In addition, since the arrangement of the plurality of first cells 41*a* and the arrangement of the plurality of second cells 42*a* are different, it becomes difficult for the noise in the first image light and the noise in the second image light to overlap each other. For this reason, display device 1 can emit image light in which noise is made inconspicuous.

In addition, in display device 1 according to the present embodiment, at least one of first holographic optical element 41 or second holographic optical element 42 includes two or more types of cells with different sizes.

In this way, by using two or more types of cells with different sizes, the arrangement of the plurality of first cells 41*a* and the arrangement of the plurality of second cells 42*a* can be easily made different.

In addition, since one or more holographic optical elements include two or more types of cells with different sizes, it becomes difficult for the noise in the first image light and the noise in the second image light to overlap each other. For this reason, display device 1 can emit image light in which noise is made inconspicuous.

In addition, in display device 1 according to the present embodiment, at least one of first holographic optical element 41 or second holographic optical element 42 includes two or more types of cells with different shapes.

In this way, by using two or more types of cells with different shapes, the arrangement of the plurality of first cells 41*a* and the arrangement of the plurality of second cells 42*a* can be easily made different.

In addition, since one or more holographic optical elements include two or more types of cells with different shapes, it becomes difficult for the noise in the first image light and the noise in the second image light to overlap each other. For this reason, display device 1 can emit image light in which noise is made inconspicuous.

In addition, in display device 1 according to the present embodiment, light guide body 30 includes third holographic optical element 43. In addition, first holographic optical element 41 is an incident holographic optical element on which the image light emitted by image light emitter 50 is incident. In addition, second holographic optical element 42 is a folding holographic optical element that diffracts the first image light emitted by first holographic optical element 41 and emits the second image light to third holographic optical element 43. In addition, third holographic optical element 43 is an emitting holographic optical element that diffracts the second image light incident and emits the third image light. In addition, third holographic optical element 43 includes a plurality of third cells 43*a* for emitting third image light obtained by diffracting the second image light propagating inside light guide body 30. The arrangement of the plurality of first cells 41*a*, the arrangement of the plurality of second cells 42*a*, and the arrangement of the plurality of third cells 43*a* are each different.

According to this, the arrangement of the plurality of first cells 41*a* in first holographic optical element 41, the arrangement of the plurality of second cells 42*a* in second holographic optical element 42, and the arrangement of the plurality of third cells 43*a* in third holographic optical element 43 are different. For this reason, it becomes difficult for the noise in the first image light generated at the boundary where two adjacent first cells 41*a* of the plurality of first cells 41*a* are in contact with each other, the noise in the second image light generated at the boundary where two adjacent second cells 42*a* of the plurality of second cells 42*a* are in contact with each other, and the noise in the third image light generated at the boundary where two adjacent third cells 43*a* of the plurality of third cells 43*a* are in contact with each other to overlap with one another. That is, it becomes difficult for the noises due to phase difference and intensity fluctuation among the first image light emitted by first holographic optical element 41, the second image light emitted by second holographic optical element 42, and the third image light emitted by third holographic optical element 43 to overlap with each other.

Therefore, display device 1 can emit image light in which noise is made inconspicuous.

In addition, in display device 1 according to the present embodiment, the size of the plurality of first cells 41*a*, the size of the plurality of second cells 42*a*, and the size of the plurality of third cells 43*a* are different from one another.

According to this, it becomes difficult for the noise in the first image light generated at the boundary where two adjacent first cells 41*a* included in first holographic optical element 41 are in contact with each other, the noise in the second image light generated at the boundary where two adjacent second cells 42*a* included in second holographic optical element 42 are in contact with each other, and the noise in the third image light generated at the boundary where two adjacent third cells 43*a* included in third holographic optical element 43 are in contact with each other to overlap one another. For this reason, display device 1 can emit image light in which noise is made inconspicuous.

In addition, in display device 1 according to the present embodiment, the plurality of first cells 41*a*, the plurality of second cells 42*a*, and the plurality of third cells 43*a* gradually increase in size in the stated order.

According to this, when second holographic optical element 42 and third holographic optical element 43 are manufactured, it is possible to suppress an increase in the time required for exposure. In particular, in the present embodiment, since second holographic optical element 42 is larger than first holographic optical element 41, it is possible to suppress an increase in the manufacturing time of second holographic optical element 42, and since third holographic optical element 43 is larger than second holographic optical element 42 and first holographic optical element 41, it is possible to suppress an increase in the manufacturing time of third holographic optical element 43.

In addition, since the plurality of first cells 41*a*, the plurality of second cells 42*a*, and the plurality of third cells 43*a* gradually increase in size in a stated order, it becomes difficult for the noise in the first image light, the noise in the second image light, and the noise in the third image light to overlap one another. For this reason, display device 1 can emit image light in which noise is made inconspicuous.

In addition, in display device 1 according to the present embodiment, each of the plurality of first cells 41*a* has the same size and the same shape. In addition, each of the plurality of second cells 42*a* has the same size and the same shape. Each of the plurality of third cells 43*a* has the same size and the same shape.

According to this, since each of the plurality of first cells 41*a* included in first holographic optical element 41 can be made to have the same size and the same shape, first holographic optical element 41 can be easily manufactured. In addition, since each of the plurality of second cells 42*a* included in second holographic optical element 42 can be made to have the same size and the same shape, second holographic optical element 42 can also be easily manufactured. In addition, since each of the plurality of third cells 43*a* included in third holographic optical element 43 can be made to have the same size and the same shape, third holographic optical element 43 can also be easily manufactured.

In addition, since the sizes of the plurality of first cells 41*a*, the sizes of the plurality of second cells 42*a*, and the sizes of the plurality of third cells 43*a* are different, it becomes difficult for the noise in the first image light, the noise in the second image light, and the noise in the third image light to overlap one another. For this reason, display device 1 can emit image light in which noise is made inconspicuous.

In addition, in display device 1 according to the present embodiment, each of the plurality of first cells 41*a*, the plurality of second cells 42*a*, and the plurality of third cells 43*a* is polygonal-shaped. In addition, the plurality of first cells 41*a*, the plurality of second cells 42*a*, and the plurality of third cells 43*a* have the same shape. In addition, the lengths (h1, w1) of the first sides in the plurality of first cells 41*a* are not integral multiples of the lengths (h2, w2) of the second sides in the plurality of second cells 42*a* corresponding to the first sides. In addition, the lengths (h1, w1) of the first sides in the plurality of first cells 41*a* are not integral multiples of the lengths (h3, w3) of the third sides in the plurality of third cells 43*a* corresponding to the first sides. The lengths (h2, w2) of the second sides in the plurality of second cells 42*a* are not integral multiples of the lengths (h3, w3) of the third sides in the plurality of third cells 43*a* corresponding to the second sides.

In this way, by making sure that the lengths of the first sides, the lengths of the second sides, and the lengths of the third sides are not integral multiples one another, the arrangement of the plurality of first cells 41*a*, the arrangement of the plurality of second cells 42*a*, and the arrangement of the plurality of third cells 43*a* can be easily made different.

In addition, since the arrangement of the plurality of first cells 41*a*, the arrangement of the plurality of second cells 42*a*, and the arrangement of the plurality of third cells 43*a* are different, it becomes difficult for the noise in the first image light, the noise in the second image light, and the noise in the third image light to overlap one another. For this reason, display device 1 can emit image light in which noise is made inconspicuous.

In addition, in display device 1 according to the present embodiment, at least one of first holographic optical element 41, second holographic optical element 42, or third holographic optical element 43 includes two types of cells different in size.

In this way, by using two or more types of cells with different sizes, the arrangement of the plurality of first cells 41*a*, the arrangement of the plurality of second cells 42*a*, and the arrangement of the plurality of third cells 43*a* can be easily made different.

In addition, since one or more holographic optical elements include two or more types of cells with different sizes, it becomes difficult for the noise in the first image light, the noise in the second image light, and the noise in the third image light to overlap one another. For this reason, display device 1 can emit image light in which noise is made inconspicuous.

In addition, in display device 1 according to the present embodiment, at least one of first holographic optical element 41, second holographic optical element 42, or third holographic optical element 43 includes two or more types of cells with different shapes.

In this way, by using two or more types of cells with different shapes, the arrangement of the plurality of first cells 41*a*, the arrangement of the plurality of second cells 42*a*, and the arrangement of the plurality of third cells 43*a* can be easily made different.

In addition, since one or more holographic optical elements include two or more types of cells with different shapes, it becomes difficult for the noise in the first image light, the noise in the second image light, and the noise in the third image light to overlap one another. For this reason, display device 1 can emit image light in which noise is made inconspicuous.

Other Embodiments, Etc.

Although the display device according to the present disclosure has been described above based on the above embodiment, the present disclosure is not limited to the embodiment.

In addition, forms obtained by applying various modifications to the embodiment conceived by a person skilled in the art or forms realized by arbitrarily combining the components and functions in the embodiment without departing from the spirit of the present disclosure are also included in this disclosure.

(Additional Note 1)

The characteristics of the display device described based on the above embodiment are shown below.

<Technology 1>

A display device comprising:
- a light guide body including a first holographic optical element and a second holographic optical element; and
- an image light emitter that emits image light to the light guide body,
- wherein the first holographic optical element includes a plurality of first cells for emitting first image light toward the second holographic optical element, the first image light being obtained by diffracting the image light propagating inside the light guide body,
- the second holographic optical element includes a plurality of second cells for emitting second image light obtained by diffracting the first image light propagating inside the light guide body, and
- an arrangement of the plurality of first cells is different from an arrangement of the plurality of second cells.

<Technology 2>
The display device according to technology 1,
wherein a size of each of the plurality of first cells is different from a size of each of the plurality of second cells.
<Technology 3>
The display device according to technology 2,
wherein the size of each of the plurality of second cells is larger than the size of each of the plurality of first cells.
<Technology 4>
The display device according to technology 2 or 3,
wherein each of the plurality of first cells has a same size and a same shape, and
each of the plurality of second cells has a same size and a same shape.
<Technology 5>
The display device according to any one of technologies 2 to 4,
wherein each of the plurality of first cells and the plurality of second cells is polygonal-shaped,
the plurality of first cells and the plurality of second cells have a same shape, and
lengths of first sides in the plurality of first cells are not integral multiples of lengths of second sides in the plurality of second cells corresponding to the first sides.
<Technology 6>
The display device according to any one of technologies 2 to 5,
wherein at least one of the first holographic optical element or the second holographic optical element includes two or more types of cells with different sizes.
<Technology 7>
The display device according to any one of technologies 2 to 6,
wherein at least one of the first holographic optical element or the second holographic optical element includes two or more types of cells with different shapes.
<Technology 8>
The display device according to technology 1,
wherein the light guide body includes a third holographic optical element,
the first holographic optical element is an incident holographic optical element on which the image light emitted by the image light emitter is incident,
the second holographic optical element is a folding holographic optical element that diffracts the first image light emitted by the first holographic optical element and emits the second image light to the third holographic optical element,
the third holographic optical element is an emitting holographic optical element that diffracts the second image light incident and emits a third image light,
the third holographic optical element includes a plurality of third cells for emitting the third image light obtained by diffracting the second image light propagating inside the light guide body, and
the arrangement of the plurality of first cells, the arrangement of the plurality of second cells, and an arrangement of the plurality of third cells are different.
<Technology 9>
The display device according to technology 8,
wherein a size of the plurality of first cells, a size of the plurality of second cells, and a size of the plurality of third cells are different from one another.
<Technology 10>
The display device according to technology 9,
the plurality of first cells, the plurality of second cells, and the plurality of third cells gradually increase in size in a stated order.
<Technology 11>
The display device according to technology 9 or 10,
wherein each of the plurality of first cells has a same size and a same shape,
each of the plurality of second cells has a same size and a same shape, and
each of the plurality of third cells has a same size and a same shape.
<Technology 12>
The display device according to any one of technologies 9 to 11,
wherein each of the plurality of first cells, the plurality of second cells, and the plurality of third cells is polygonal-shaped,
the plurality of first cells, the plurality of second cells, and the plurality of third cells have a same shape,
lengths of first sides in the plurality of first cells are not integral multiples of lengths of second sides in the plurality of second cells corresponding to the first sides,
the lengths of the first sides in the plurality of first cells are not integral multiples of lengths of third sides in the plurality of third cells corresponding to the first sides, and
the lengths of the second sides in the plurality of second cells are not integral multiples of the lengths of the third sides in the plurality of third cells corresponding to the second sides.
<Technology 13>
The display device according to any one of technologies 9 to 12,
wherein at least one of the first holographic optical element, the second holographic optical element, or the third holographic optical element includes two or more types of cells with different sizes.
<Technology 14>
The display device according to any one of technologies 9 to 13,
wherein at least one of the first holographic optical element, the second holographic optical element, or the third holographic optical element includes two or more types of cells with different shapes.

While various embodiments have been described herein above, it is to be appreciated that various changes in form and detail may be made without departing from the spirit and scope of the present disclosure as presently or hereafter claimed.

Further Information about Technical Background to This Application

The disclosure of the following patent application including specification, drawings, and claims are incorporated herein by reference in their entirety: Japanese Patent Application No. 2023-057681 filed on Mar. 31, 2023.

INDUSTRIAL APPLICABILITY

The present disclosure can be used in a display device such as a head-up display device of a vehicle.

The invention claimed is:
1. A display device comprising:
a light guide body including a first holographic optical element and a second holographic optical element; and
an image light emitter that emits image light to the light guide body, wherein the first holographic optical element includes a plurality of first cells for emitting first image light toward the second holographic optical element, the first image light being obtained by diffracting the image light propagating inside the light guide body, the second holographic optical element includes a plurality of second cells for emitting second image light obtained by diffracting the first image light propagating inside the light guide body, an arrangement of the plurality of first cells is different from an arrangement of the plurality of second cells, a size of each of the plurality of first cells is different from a size of each of the plurality of second cells, each of the plurality of first cells and the plurality of second cells is polygonal-shaped, the plurality of first cells and the plurality of second cells have a same shape, and lengths of first sides in the plurality of first cells are not integral multiples of lengths of second sides in the plurality of second cells corresponding to the first sides.

2. The display device according to claim 1, wherein the size of each of the plurality of second cells is larger than the size of each of the plurality of first cells.

3. The display device according to claim 1, wherein each of the plurality of first cells has a same size and a same shape, and each of the plurality of second cells has a same size and a same shape.

4. The display device according to claim 1, wherein at least one of the first holographic optical element or the second holographic optical element includes two or more types of cells with different sizes.

5. The display device according to claim 1, wherein at least one of the first holographic optical element or the second holographic optical element includes two or more types of cells with different shapes.

6. A display device comprising:
a light guide body including a first holographic optical element and a second holographic optical element; and
an image light emitter that emits image light to the light guide body,
wherein the first holographic optical element includes a plurality of first cells for emitting first image light toward the second holographic optical element, the first image light being obtained by diffracting the image light propagating inside the light guide body,
the second holographic optical element includes a plurality of second cells for emitting second image light obtained by diffracting the first image light propagating inside the light guide body,
an arrangement of the plurality of first cells is different from an arrangement of the plurality of second cells,
the light guide body includes a third holographic optical element,
the first holographic optical element is an incident holographic optical element on which the image light emitted by the image light emitter is incident,
the second holographic optical element is a folding holographic optical element that diffracts the first image light emitted by the first holographic optical element and emits the second image light to the third holographic optical element,
the third holographic optical element is an emitting holographic optical element that diffracts the second image light incident and emits a third image light,
the third holographic optical element includes a plurality of third cells for emitting the third image light obtained by diffracting the second image light propagating inside the light guide body, and
the arrangement of the plurality of first cells, the arrangement of the plurality of second cells, and an arrangement of the plurality of third cells are different.

7. The display device according to claim 6, wherein a size of the plurality of first cells, a size of the plurality of second cells, and a size of the plurality of third cells are different from one another.

8. The display device according to claim 7, the plurality of first cells, the plurality of second cells, and the plurality of third cells gradually increase in size in a stated order.

9. The display device according to claim 7, wherein each of the plurality of first cells has a same size and a same shape, each of the plurality of second cells has a same size and a same shape, and each of the plurality of third cells has a same size and a same shape.

10. The display device according to claim 7, wherein each of the plurality of first cells, the plurality of second cells, and the plurality of third cells is polygonal-shaped, the plurality of first cells, the plurality of second cells, and the plurality of third cells have a same shape, lengths of first sides in the plurality of first cells are not integral multiples of lengths of second sides in the plurality of second cells corresponding to the first sides, the lengths of the first sides in the plurality of first cells are not integral multiples of lengths of third sides in the plurality of third cells corresponding to the first sides, and the lengths of the second sides in the plurality of second cells are not integral multiples of the lengths of the third sides in the plurality of third cells corresponding to the second sides.

11. The display device according to claim 7, wherein at least one of the first holographic optical element, the second holographic optical element, or the third holographic optical element includes two or more types of cells with different sizes.

12. The display device according to claim 7, wherein at least one of the first holographic optical element, the second holographic optical element, or the third holographic optical element includes two or more types of cells with different shapes.

* * * * *